United States Patent
Kato (10) Patent No.: US 6,353,591 B1
(45) Date of Patent: Mar. 5, 2002

(54) DISK ROTATING DEVICE

(75) Inventor: Kazunari Kato, Tokyo (JP)

(73) Assignee: Alpine Electronics, Inc. (JP)

( * ) Notice: Subject to any disclaimer, the term of this patent is extended or adjusted under 35 U.S.C. 154(b) by 0 days.

(21) Appl. No.: 09/247,141

(22) Filed: Feb. 9, 1999

(30) Foreign Application Priority Data

Feb. 9, 1998 (JP) .......................................... 10-026980

(51) Int. Cl.$^7$ ........................ G11B 23/00; G11B 25/00; G11B 3/70; G11B 5/84; G11B 7/26
(52) U.S. Cl. ...................................... 369/270; 369/282
(58) Field of Search ............................... 369/282, 270, 369/271, 208, 258, 261, 263, 264; 360/98.08, 99.05, 99.12

(56) References Cited

U.S. PATENT DOCUMENTS

| | | | | |
|---|---|---|---|---|
| 4,072,315 A | * | 2/1978 | Tsujihara et al. | 369/266 |
| 4,510,592 A | | 4/1985 | Kanamaru et al. | 369/270 |
| 4,541,086 A | * | 9/1985 | Tanaka | 369/271 |
| 4,742,509 A | | 5/1988 | Okita et al. | 369/270 |
| 4,853,924 A | * | 8/1989 | Takahashi et al. | 369/270 |
| 5,006,945 A | * | 4/1991 | Furusawa | 360/99.12 |
| 5,917,802 A | * | 6/1999 | Konno | 369/271 |

OTHER PUBLICATIONS

American Heritage Dictionary of the English Lang., 3rd Edition (1992: Houghton Mifflin Co.), spring entry, from MS Bookshelf Basics (1996: Microsoft Corp.).*

* cited by examiner

Primary Examiner—Brian E. Miller
Assistant Examiner—Julie Anne Watko
(74) Attorney, Agent, or Firm—Brinks Hofer Gilson & Lione

(57) ABSTRACT

A disk rotating device containing: a rotating plate having a support part on which a disk is mounted, which a motor drives to rotate; a centering member provided on the center of the rotating plate and moveable in the direction of the rotational center axis of the rotating plate, which is inserted through the center hole of the disk to thereby center the disk; and an enabling member provided in a space between the rotating plate and the centering member, which projects out the centering member above the support part. Further, when the minimum value of the diameter of the center hole of the disk is given by Dmin and the maximum value thereof is given by Dmax, the maximum outer diameter $\phi A$ of the centering member is set within a range of Dmin<$\phi A$<Dmax. Thus, the disk rotating device of the invention is able to function as the fixed type disk rotating device when the diameter of the center hole of a disk inserted is larger than the maximum outer diameter of the centering member (hub), and to function as the movable type disk rotating device only when the diameter of the center hole of a disk is smaller than the maximum outer diameter of the centering member. Accordingly, the frequency at which the device functions as the movable type disk rotating device, and the stroke (lowering) of the centering member can be reduced. Therefore, the disk rotating device and the disk drive using this disk rotating device can be made thinner.

16 Claims, 4 Drawing Sheets

DISK ROTATING DEVICE

BACKGROUND OF THE INVENTION

1. Field of the Invention

The present invention relates to a disk rotating device in a disk drive on which a disk such as a CD (compact disk) or DVD (digital versatile disk) is mounted, and particularly to a disk rotating device that secures a disk, whereby a disk drive using this disk rotating device can be made thinner.

2. Description of the Related Art

Conventional disk rotating devices include the so-called movable type disk rotating device in which a hub (centering member) inserted through the center hole of a disk can move up and down, and the so-called fixed type disk rotating device in which the hub does not move.

Figure 4:
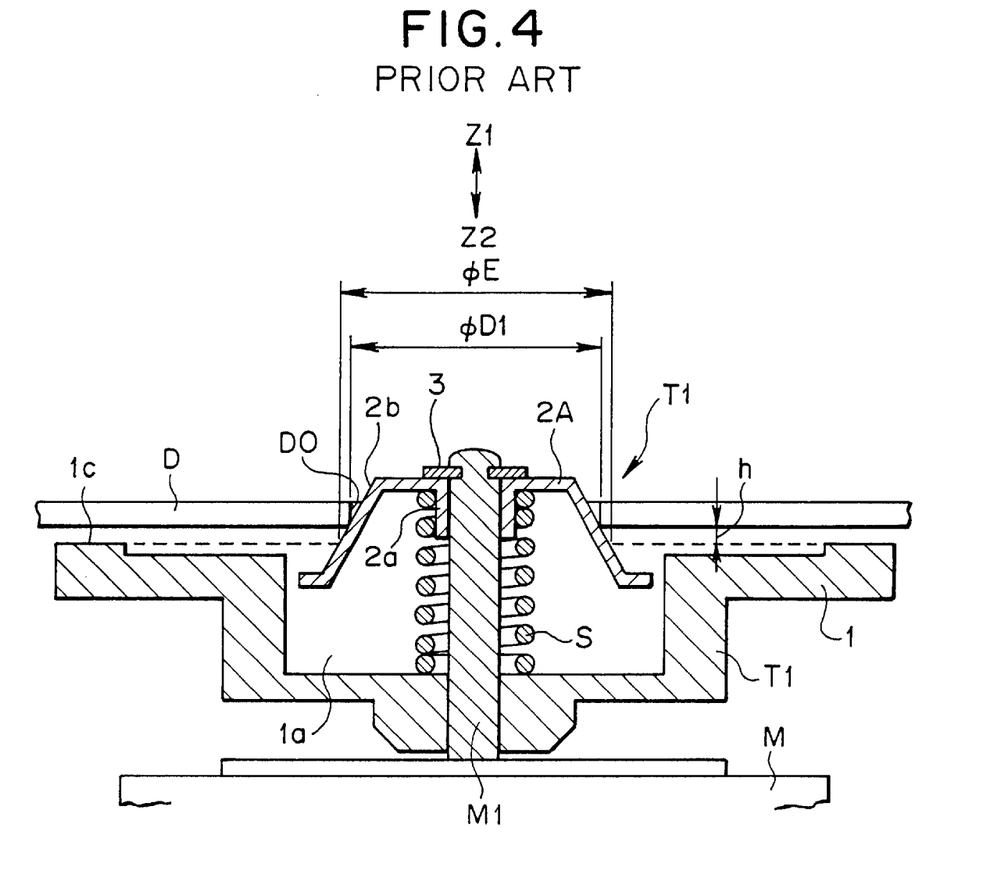
FIG. 4 is a sectional view to illustrate a conventional movable type disk rotating device.
Figure 5:
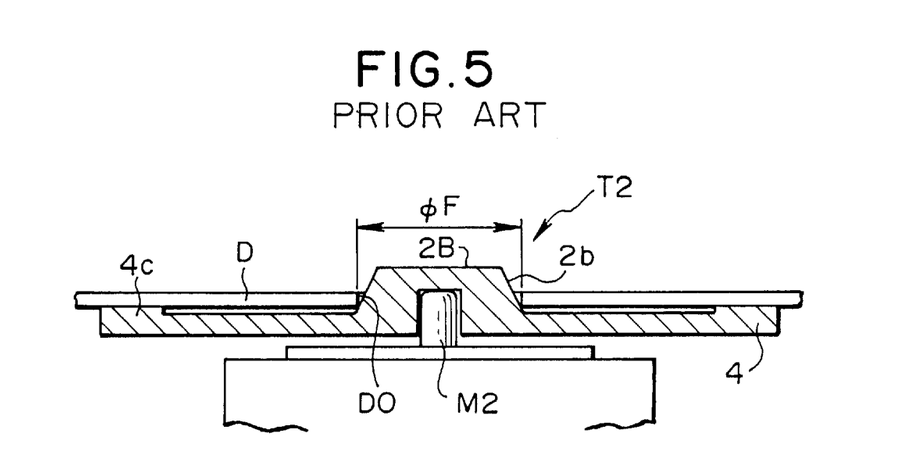
FIG. 5 is a sectional view to illustrate a conventional fixed type disk rotating device.

FIG. 4 is a sectional view illustrating the structure and principle of a conventional movable type disk rotating device, and FIG. 5 is a sectional view illustrating the structure and principle of a conventional fixed type disk rotating device.

In the movable type disk rotating device T1 shown in FIG. 4, a rotating plate 1 whose circumference is made into a disc-like shape is fastened to a rotating shaft M1 of a spindle motor M. The rotating plate 1 has a recess 1a formed in its center. Inside of the recess 1a is a movable hub (centering member) 2A energized by a coil spring S, which is mounted movably in the vertical (Z) direction. The movable hub 2A has a cylindrical slide part 2a formed on its inner fringe part, and extends in the vertical (Z) direction. The slide part 2a slides and is guided on the circumference of the rotating shaft M1, so that the movable hub 2A is verticallymoveable. The rotating shaft M1 is provided with a stopper 3 on the end (Z1 side) thereof, which prevents the movable hub 2A from falling off in the Z1 direction. The rotating plate 1 has a support plane 1c formed around the entire circumference thereof, which is formed slightly higher than the remaining portion of the rotating plate 1. A disk D is mounted on the support plane 1c.

On the other hand, in a fixed type disk rotating device T2 shown in FIG. 5, a substantially disc-formed rotating plate 4 is fastened to a rotating shaft M2 of a spindle motor M. The rotating plate 4 has a fixed hub (centering member) 2B projecting from the center thereof. And, in the same manner as the foregoing movable type disk rotating device T1, the rotating plate 4 has a support plane 4c formed around the entire circumference thereof, on which the disk D is mounted. The foregoing fixed hub 2B and the rotating plate 4 are formed into one body by machining or injection molding so as not to be separated from each other.

In either of the foregoing disk rotating devices, the outer circumferential planes 2b of the hubs (movable hub 2A and fixed hub 2B) are tapered. The outer circumference of the hub is inserted through the center hole D0 of the disk D, and thereby the disk D is guided to be centered by the tapered outer circumferential plane 2b.

Here, the inside diameter of the disk D, for example a CD (compact disk), loaded on the foregoing disk rotating device, namely the diameter of the center hole D0, is 15.0 mm on the specification. The diameter has the allowance on the specification which is from 0.0 through +0.1 mm. Consequently, the inside diameter is specified within the range from 15.0 mm through 15.1 mm. The foregoing specification is the 'IEC (International Electrotechnical Communication) 908 Standard'.

The maximum outer diameter $\phi E$ of the movable hub 2A shown in FIG. 4 is set larger than the maximum inside diameter (15.1 mm) on the specification of the normal CD. Here, the maximum outer diameter $\phi E$ of the movable hub 2A is the diameter of the movable hub 2A on a virtual plane that includes the support plane 1c in the state in which the movable hub 2A is maximally moved in the Z1 direction (the lowering of the hub is 0).

Also, the outer diameter of the head of the movable hub 2A is set smaller than the minimum inside diameter (15.0 mm) on the specification of the CD. Therefore, in the movable type disk rotating device T1, the peripheral edge of the center hole D0 of the disk D necessarily comes into contact with the tapered outer circumferential plane 2b of the movable hub 2A on some position on the outer circumferential plane 2b. Accordingly, the center of the center hole D0 of the disk D coincides with the axis of the rotating shaft M1. In addition, a damper (not illustrated) is lowered to press the disk D in the Z2 direction, whereby the movable hub 2A is lowered in the Z2 direction, and the disk D is held in a space between the damper and the support plane 1c. In FIG. 4, the lowering of the movable hub 2A is illustrated by the symbol h.

On the other hand, in case of the fixed type disk rotating device T2, the maximum outer diameter $\phi F$ of the fixed hub 2B is set slightly smaller than the minimum inside diameter (15.0 mm) on the specification of the center hole D0 of the disk D, which is about 14.98 mm, for example. Accordingly, all the disks D of which diameters of the center holes D0 are within the foregoing specification can be mounted on the rotating plate 4, with the fixed hub 2B completely inserted through the center holes D0 of the disks D.

Here, the maximum outer diameter $\phi F$ of the fixed hub 2B is the diameter of the outer circumferential plane 2b of the fixed hub 2B, which is on a virtual plane that includes the support plane 4c.

However, both the foregoing rotating disk devices are intended for CDs. Accordingly, when they are used in a disk drive that can both record and reproduce data to and from disks in which data are recorded with high density, such as a DVD (digital versatile disk), they have the following problems.

Figure 6:
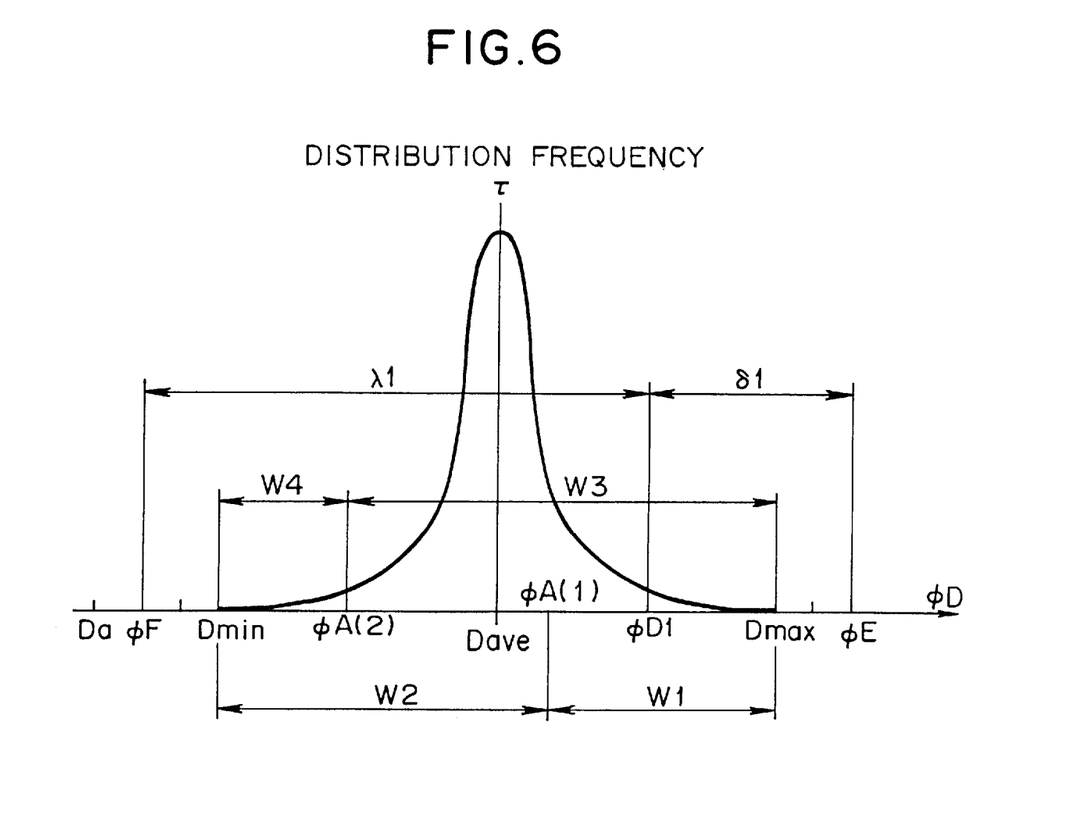
FIG. 6 illustrates a distribution chart of inside diameter errors of disks.

FIG. 6 illustrates a distribution chart of inside diameter errors of DVDs, in which the horizontal axis indicates the diameter $\phi D$ of the center hole of a DVD and the vertical axis indicates the distribution frequency. A DVD is made of two sheets of laminated discs. From the specification (DVD format), the inside diameter of an individual disc before lamination is 15.00 mm to 15.15 mm, and the inside diameter of a disk after lamination is defined as 15.00 at minimum. That is, the minimum value Dmin of the inside diameter $\phi D$ on the DVD specification is 15.00 mm, and the maximum value Dmax is 15.15 mm.

In the conventional movable disk rotating device T1, the peripheral edges of the center holes D0 of all the disks D are made to come into contact with the outer circumferential plane 2b of the movable hub 2A. Therefore, the maximum outer diameter $\phi E$ of the movable hub 2A is needed to be set more than the maximum value Dmax of the diameters $\phi D$ of the center holes D0 of all the disks D as shown in FIG. 6.

Assuming that the inside diameter of the disk D actually loaded as shown in FIG. 4 is $\phi D1$, the difference of the inside diameter between the maximum outer diameter $\phi E$ and the inside diameter of the disk D actually loaded is $\phi E - \phi D1$, which is a value indicated by the symbol $\delta 1$ in FIG. 6. Further, the maximum difference of the inside diameter $\delta 1max$ is given when the inside diameter $\phi D1$ of the disk D is Dmin ($\phi D1 = \phi Dmin$), and it is expressed by $\delta 1max = (\phi E -

φDmin). And, the minimum difference of the inside diameter δ 1min is given when φD1 is equal to Dmax, which is expressed by δ 1min=(φE−φDmax). And, as the inside diameter φD1 becomes smaller, namely, as the difference of the inside diameter δ 1 (=φE−φD1) becomes larger, the center hole D0 of the disk D comes in contact with the outer circumferential plane 2b at a position closer to the head of the movable hub 2A. That is, the lowering h of the disk D to the support plane 1c of the rotating plate 1 becomes larger. Accordingly, the lowering h is determined by the difference of the inside diameter δ 1.

As mentioned above, the inside diameter φD of a DVD contains a wider error range than the inside diameter of a CD in terms of the specification. Therefore, the difference of the inside diameter δ 1 with the maximum outer diameter φE of the movable hub 2A becomes larger. Accordingly, the lowering h of the movable hub 2A is needed to be set larger than that of the CD. Therefore, it becomes difficult to make thinner the movable disk rotating device T1 and the disk drive that mounts the movable disk rotating device T1. Since the maximum outer diameter φE of the movable hub 2A is set so that, whenever a disk D of any inside diameter φD is loaded, the disk D can move down in the Z2 direction, it is required to smoothly slide so as not to produce gallings between the rotating shaft M1 and the movable hub 2A. Accordingly, the cylindrical slide part 2a has to be sufficiently long in the Z direction. This point also makes it difficult to make thinner the movable disk rotating device T1 and the total thickness of the disk drive using this device.

Further, since the coil spring S lifts the movable hub 2A as mentioned above, the stopper 3 of an E ring or the like is needed, which increases the number of the components, which is a problem.

Further, the use of the coil spring S requires a sufficient flexure margin so that the coil spring does not adhere completely during contraction, which is also a restriction against making thinner the movable disk rotating device T1 and the total thickness of the disk drive using this device.

On the other hand, in the fixed type disk rotating device T2, since it is required to pass the center holes D0 of all the disks D without interference around the outer circumferential plane 2b of the fixed hub 2B, the maximum outer diameter φF of the fixed hub 2B is set smaller than the minimum value Dmin of the inside diameter of the disk D. Therefore, there appears a dislocation (a gap indicated by the symbol λ 1 in FIG. 6) equivalent to (φD1−φF) between the disk D of the inside diameter φD1 and the fixed hub 2B. This dislocation λ 1 becomes larger as the inside diameter φD1 of the disk D becomes larger. And, when the disk D is rotated, since the eccentricity increases in accordance with the dislocation λ 1, it becomes impossible for the tracking servo system of the optical pickup to follow the track in such a disk as a DVD in which data are recorded with high density, and reproduction becomes impossible. Here, the minimum dislocation λ 1min appears when the inside diameter of the disk D is the minimum value Dmin, which is given by λ 1min=(Dmin−φF). And, the maximum dislocation λ 1max appears when the inside diameter of the disk D is the maximum value Dmax, which is given by λ 1max=(Dmax−φF).

Further, in both CD and DVD, a poor quality disk in which the inside diameter is smaller than 15.0 mm (being the minimum value on the specification) and less than the maximum outer diameter φF of the fixed hub 2B can be marketed with a rare probability. When such a disk is loaded on the foregoing fixed type disk rotating device T2, the center hole of the disk is caught on the outer circumferential plane 2b of the fixed hub 2B, and the disk cannot be mounted on the support plane 4c but takes an abnormal position. Therefore, there occurs a clamping failure when the damper holds the disk, which is a problem.

The present invention has been made to solve the foregoing problems, and it is an object of the invention to provide a disk rotating device that can make thinner the disk drive to reproduce a CD and to record and/or reproduce a DVD.

Further, it is another object of the invention to provide a disk rotating device whereby a diameter error of the center hole of a disk can be absorbed and the disk can be clamped securely in a normal state.

SUMMARY OF THE INVENTION

In order to accomplish the foregoing objects, the disk rotating device of the invention contains: a rotating plate having a support part on which a disk is mounted, which a motor drives to rotate; a centering member provided on the center of the rotating plate and moveable in the direction of the rotational center axis of the rotating plate, which is inserted through the center hole of the disk to thereby center the disk; and an enabling member provided in a space between the rotating plate and the centering member, which projects out the centering member above the support part. Further, when the minimum value of the diameter of the center hole of the disk is given by Dmin and the maximum value thereof is given by Dmax, the maximum outer diameter φA of the centering member is set within a range of Dmin<φA<Dmax.

In the disk rotating device of the invention, with regard to a disk having the inside diameter within a range between φA and Dmax, the device functions as the so-called fixed type disk rotating device such that the centering member does not move in the direction of the rotational center axis of the rotating plate. With regard to a disk having the inside diameter within a range between Dmin and φA, the device functions as the so-called movable type disk rotating device in that the centering member comes into contact with the center hole of the disk and moves. Therefore, the disk rotating device of the invention is different from the conventional movable type disk rotating device in which the centering member moves up and down for all the disks, because the centering member moves down only when a disk is loaded that has an inside diameter between Dmin and φA. Accordingly, the device of the invention is able to reduce the amount of lowering, and to make thinner the disk rotating device and the disk drive using this disk rotating device.

Preferably, the maximum outer diameter φA is set within a range of Dmin<φA≦(Dmax+Dmin)/2.

Assuming that the variation of the inside diameters φD of the disks forms a normal distribution as shown in FIG. 6, most of the inside diameters fall near the average value Dave=(Dmax+Dmin)/2. Therefore, when the outer diameter φA of the centering member is set in the range of Dmin<φA≦(Dmax+Dmin)/2, the disk rotating device of the invention is able to function as the fixed type disk rotating device for most of the disks, and to function as the movable type disk rotating device for the disks having an inside diameter less than the maximum outer diameter φA of the centering member which is within the specification. Therefore, the lowering of the centering member can be made still smaller.

Further, the disk rotating device of the invention contains: a rotating plate having a support part on which a disk is mounted, which a motor drives to rotate; a centering member provided on the center of the rotating plate and moveable in the direction of the rotational center axis of the rotating plate, which is inserted through the center hole of the disk to thereby center the disk; and an enabling member provided in a space between the rotating plate and the centering member, which projects out the centering member above the support part. Further, when the minimum value on the specification of the diameter of the center hole of the disk is given by Dmin and a still smaller diameter than this minimum value Dmin is given by Da, the maximum outer diameter $\phi A$ of the centering member is set within a range of $Da < \phi A < Dmin$.

When the maximum outer diameter $\phi A$ of the centering member is set in such a range, the device of the invention is able to function as the fixed type disk rotating device such that the centering member does not move up and down for most of the disks. Only when an exceptionally poor quality disk whose diameter of the center hole is smaller than the minimum value Dmin is loaded, the device of the invention is able to function as the movable type disk rotating device. Therefore, the lowering of the centering member can be made still smaller, and the disk rotating device and the disk drive can be made still thinner.

Further, the disk rotating device of the invention contains: a rotating plate having a support part on which a disk is mounted, which a motor drives to rotate; a centering member provided on the center of the rotating plate and moveable in the direction of the rotational center axis of the rotating plate, which is inserted through the center hole of the disk to thereby center the disk; and an elastic compressible member of which one face is fastened to the centering member and the other face is fastened to the rotating plate, which projects out the centering member above the support part.

In the above mentioned embodiment, the elastic compressible member preferably is made of a foaming material or a rubber. Also preferably, one face of the elastic compressible member is adhered to the centering member and the other face thereof is adhered to the rotating plate.

The elastic compressible member of the invention is made of a foaming material such as an urethane, which has a specific volume; and it is fastened to both the centering member and the rotating plate by adhesion or the like. Therefore, as compared to the disk rotating device shown in FIG. 4, the stopper 3 is not needed, which reduces the number of the components. At the same time, a large flexure margin as the coil spring requires is not needed, which enables the device to be made thinner. Further, the elastic compressible member preferably possesses an appropriate hardness such that the elastic compressible member is elastically compressed by a clamping force when the damper is lowered, but is not compressed by a pressure of a disk being loaded on the centering member.

Further, since at least one of the centering member and the rotating plate has a recess formed thereon and the elastic compressible member is engaged in the recess, the positioning of the elastic compressible member can easily be accomplished.

DESCRIPTION OF THE PREFERRED EMBODIMENT

The preferred embodiment of the invention will now be described with reference to the accompanying drawings.

Figure 1:
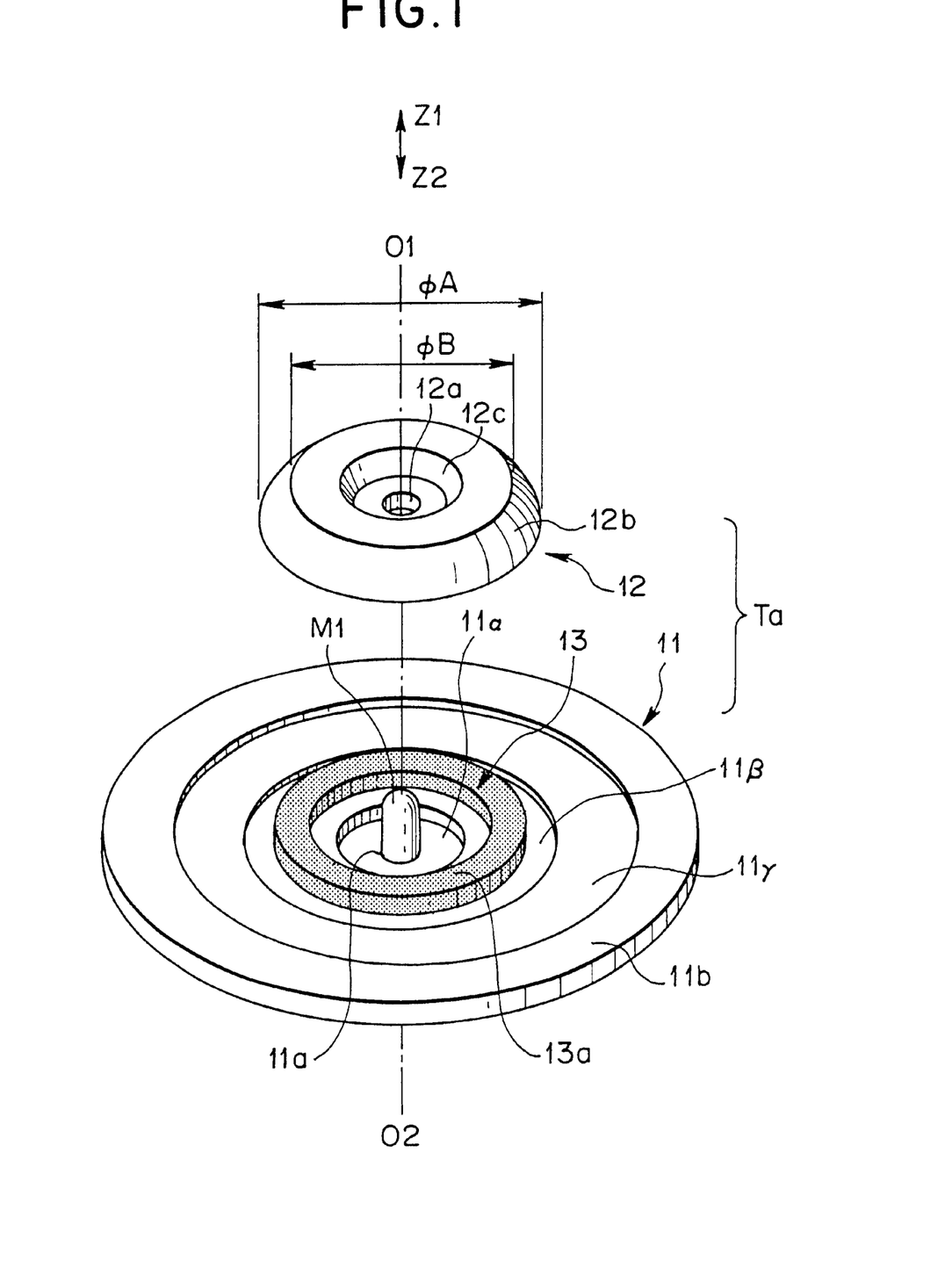
FIG. 1 is a perspective view to illustrate a disk rotating device according to the invention.
Figure 2:
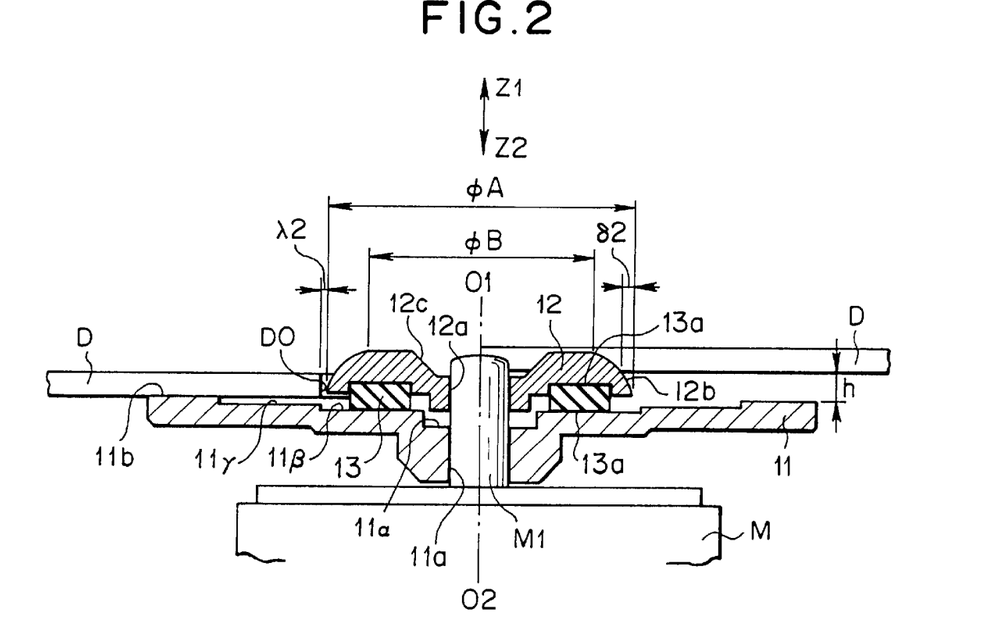
FIG. 2 is a sectional view to illustrate the state in which a disk is mounted on a disk rotating device according to the invention.
Figure 3:
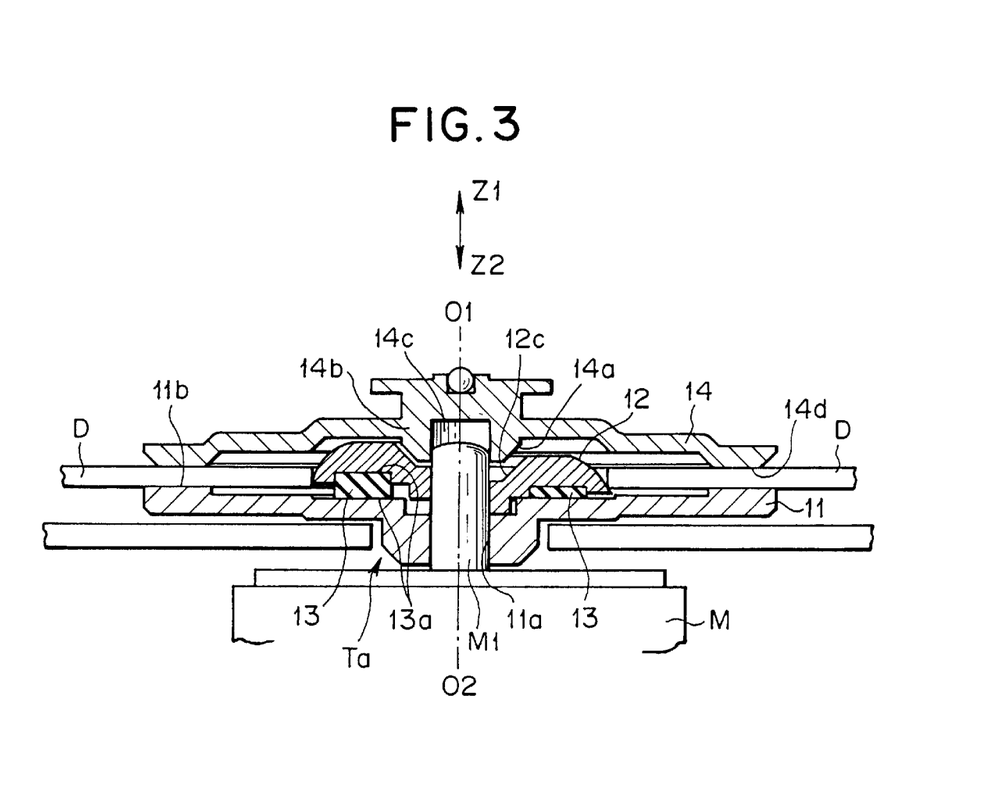
FIG. 3 is a sectional view to illustrate the state in which a disk is held on a disk rotating device according to the invention.

FIG. 1 is a perspective view to illustrate a disk rotating device according to the invention. FIG. 2 is a sectional view to illustrate the state of a disk being loaded; and FIG. 3 is a sectional view to illustrate the state in which a disk is held between the disk rotating device and the clamper. Further, FIG. 2 and FIG. 3 each illustrate the situation in which the inside diameter of a disk is larger than the outer diameter of the hub (centering member) on the left of the line 01–02, and the situation in which the inside diameter of a disk is smaller than the outer diameter of the hub (centering member) on the right of the line 01–02.

The disk rotating device Ta shown in FIG. 1 and FIG. 2 is mainly comprised of a rotating plate 11 on which a disk D is mounted, a hub (centering member) 12 which passes through the center hole D0 of the disk D to center the disk D thereon, and an elastic compressible member 13.

The rotating plate 11 is made by machining a metal or by the injection molding of a synthetic resin, and the cross-section of the rotating plate 11 is shaped in a stepped form. From inside toward outside, the rotating plate 11 is provided with a first recess 11α, a second recess 11β, and a third recess 11γ. At the center of the first recess 11α, a through hole 11a is bored; and around the circumferential edge formed the highest (toward Z1), a support plane (support part) 11b is formed. The rotating shaft M1 of the spindle motor M is forced in the through hole 11a, and the spindle motor M drives the rotating plate 11 in rotation. The support plane 11b forms an annular plane that is perpendicular to the rotating shaft M1 (01–02 line) and supports the disk D horizontally.

The second recess 11β has the elastic compressible member 13 formed in an annular shape, which is positioned concentrically. The elastic compressible member 13 is not a component that demonstrates its elasticity by changing its free length without changing volume like a coil spring, but it is comprised of an elastic material that produces an elastic deformation by contraction of its volume like a sponge system or rubber system. Preferably, the elastic compressible member 13 is made of a foaming material such as an urethane, which has a specific hardness. On the bottom of the elastic compressible member 13 is formed an adhesive layer of, for example, a double faced adhesive tape, which firmly adheres the member 13 on the second recess 11β of the rotating plate 11.

The hub 12 is also made by machining or injection molding in the same manner as the rotating plate 11, and a through hole 12a is bored therein. On the upper plane adjacent to the through hole 12a is formed an acceptance portion 12c that receives a bearing part 14b of a damper 14 that is described later. The peripheral plane of the hub 12 is tapered to form a guide plane 12b that is inclined in a convex curved shape from the upper (Z1) side toward the lower (Z2) side. Here in FIG. 1, the symbol φA denotes the maximum outer diameter of the lower end of the hub 12, and the symbol φB denotes the minimum outer diameter of the upper end that starts the guide plane 12b.

The upper face of the foregoing elastic compressible member 13 is provided with an adhesive layer 13a of a double faced adhesive tape or the like in the same manner as the bottom side. The upper face of the elastic compressible member 13 is positioned to be engaged in a recessed portion formed on the rear face of the hub 12, and is firmly adhered thereto. That is, the hub 12 is attached to the rotating plate 11 through the elastic compressible member 13. As mentioned above, since the elastic compressible member 13 is positioned to be engaged in the recessed portion formed on the rear face of the hub 12, the assembly work can easily beaccomplished. Moreover, since both faces of the elastic compressible member 13 are fastened to the rotating plate 11 and the hub 12, the torque of the rotating plate 11 is transmitted to the hub 12, and the hub 12 does not slip relative to the rotating plate 11. Furthermore, the inside diameter of the second recess 11β is formed larger than the maximum outer diameter φA so that when the elastic compressible member 13 iscompressed, the hub 12 can sink in the second recess 11β.

Since the elastic compressible member 13 has a specific volume and is adhered to both the rotating plate 11 and the hub 12, an extra member is not required to prevent the hub 12 from leaping over from the second recess 11β, i.e., to prevent the hub 12 from slipping out from the rotating shaft M1. Therefore, the construction of the invention simplifies the structure compared to the conventional disk rotating device T1, and reduces the number of used components. And, since the elastic compressible member 13 exerts its elasticity by changing volume, it is not required to provide a large flexure margin as for a coil spring, and the height of the disk rotating device Ta in the vertical direction (Z direction) can be made smaller.

As shown in FIG. 3, the damper 14 is provided above the disk rotating device Ta so as to freely move up and down. On the center of the damper 14 facing the disk rotating device Ta is formed the bearing part 14b received by the acceptance portion 12c of the foregoing hub 12. Further, the front end of the rotating shaft M1 of the spindle motor M is inserted in a bearing 14c formed in the center of the bearing part 14b. On the rim of the damper 14 is formed a support plane 14d that faces the support plane 11b of the foregoing rotating plate 11.

The disk D carried above the disk rotating device Ta by a carriage (not illustrated) is centered by the hub 12 passing through the center hole D0 of the disk. Thereafter, the damper 14 is lowered to securely hold the disk D between the support plane 11b and the support plane 14d. Thereafter, the spindle motor M rotates to give a specific torque to the disk D.

Next, the operation when the disk is loaded on the disk rotating device according to this invention will be described.

When Functioning as the Fixed Type Disk Rotating Device

When the inside diameter φD of the disk D is larger than the maximum outer diameter φA of the hub 12 (φA<φD), as shown on the left half plane in FIG. 2, the center hole D0 of the disk D is able to pass over the hub 12 without catching. Therefore, the center hole D0 of the disk D is not caught by the guide plane 12b of the hub 12, and the disk D is supported horizontally on the support plane 11b of the rotating plate 11. Next, as shown on the left half plane in FIG. 3, the damper 14 is lowered to hold the disk D horizontally between the support plane 11b of the rotating plate 11 and the support plane 14d of the damper 14. Again, the spindle motor M drives the disk D in rotation.

When Functioning as the Movable Type Disk Rotating Device

When the inside diameter φD of the disk D is smaller than the maximum outer diameter φA of the hub 12 (φA>φD), the center hole D0 of the disk D inserted on the hub 12 is caught on the surface of the guide plane 12b. That is, as shown on the right half plane in FIG. 2, the disk D is temporarily supported in a floating state off the rotating plate 11. Next, the damper 14 is lowered, and the disk D is pressed down toward the rotating plate 11 by the support plane 14d of the damper 14. However, at the same time, the edge of the center hole D0 of the disk D presses the guide plane 12b. Therefore, as shown on the right half plane in FIG. 3, the hub 12 is pressed down toward the rotating plate 11 to press the elastic compressible member 13, and the disk D can be mounted on the support plane 11b of the rotating plate 11. That is, the disk D can be held in a horizontal position between the support plane 11b and the support plane 14d. Further, since the center hole D0 of the disk D is in contact with the guide plane 12b, the disk D can be rotated without an eccentricity.

As to the mode of the maximum outer diameter φA of the hub 12 in the disk rotating device Ta, the following cases can beseen, in reference to the distribution chart shown in FIG. 6.

(i) The case in which the maximum outer diameter φA of the hub 12 is set within a range between the minimum value Dmin and the maximum value Dmax of the inside diameter φD of the disk D shown in the distribution chart of FIG. 6 (Dmin<φA(1)<Dmax).

Assuming that the maximum outer diameter φA of the hub 12 is set to φA(1) as shown in FIG. 6, for example, with regard to a disk for which the inside diameter φD is within a range W1 (φA(1)<φD≦Dmax) between the maximum outer diameter φA(1) and the maximum value Dmax, the hub 12 passes through the center hole D0 without a catch. Therefore, this device functions as the fixed type disk rotating device. With regard to a disk for which the inside diameter φD is within a range W2 (Dmin≦φD<φA(1)) between the minimum value Dmin and the maximum outer diameter φA(1), the center hole D0 of the disk D is caught on the surface of the guide plane 12b of the hub 12. Therefore, this device functions as the movable type disk rotating device. Thus, as the maximum outer diameter φA(1) approaches the maximum value Dmax, this device has a higher probability to function as the movable type disk rotating device. To the contrary, as the maximum outer diameter φA(1) approaches to the minimum value Dmin, this device has a higher probability to function as the fixed type disk rotating device.

And, the difference of radius δ 2 shown in FIG. 2 is produced when the disk rotating device Ta functions as the movable type disk rotating device, and the maximum difference of radius δ 2max is expressed by (φA(1)−Dmin)/2, when the inside diameter φD of the disk is set to the minimum value Dmin. That is, as compared to the conventional device in which the maximum outer diameter φE of the movable hub 2A is set larger than the maximum value Dmax of the inside diameter of the disk, the maximum difference of radius δ 2max becomes smaller (δ 1max/2>δ2max). Thereby, the lowering h of the hub 12 can be decreased. And, since the stroke of the lowering h can be shortened and the lowering frequency of the hub 12 can be reduced, it is not required to make long the slide plane (through hole 12a) of this hub 12 to the rotating shaft M1. Therefore, it is possible to make thinner the disk rotating device Ta itself.

On the other hand, the dislocation λ 2 is produced when the disk rotating device Ta functions as the fixed type disk rotating device, and the maximum dislocation δ 2max is expressed by (Dmax−φA(1))/2, when the inside diameter of the disk is set to the maximum value Dmax. As compared to the conventional device in which the maximum outer diameter φF of the fixed hub 2B is set smaller than the minimum value Dmin of the inside diameter of the disk, the maximum dislocation λ 2max becomes smaller (λ 1max/2>λ 2max). Therefore, when a disk is rotated, an eccentricity is less likely to be produced.

(ii) The case in which the maximum outer diameter φA of the hub 12 is set within a range of Dmin<φA<Dave=(Dmin+Dmax)/2.

Assuming that the variation of the inside diameters of the disks D forms a normal distribution as shown in FIG. 6, most of the inside diameters fall near the average value Dave=(Dmin+Dmax)/2. Therefore, when the maximum outer diameter φA of the hub 12 is set less than Dave, it is possible to have the disk rotating device Ta function as the fixed type disk rotating device for most of the disks, and to function as the movable type disk rotating device only for the disks having exceptionally small inside diameters. This way, the lowering h of the hub 12 can be made still smaller. Even though the variation of the inside diameters of the disks does not form a normal distribution, a similar effect can be expected.

Assuming that the maximum outer diameter φA of the hub 12 is set to φA(2) as shown in FIG. 6, for example, this device functions as the fixed type disk rotating device with regard to a disk for which the inside diameter φD is within a range W3 (φA(2)<φD≦Dmax) between the maximum outer diameter φA(2) and the maximum value Dmax. With regard to a disk for which the inside diameter φD is within a range W4 (Dmin≦φD<φA(2)) between the minimum value Dmin and the maximum outer diameter φA(2), this device functions as the movable type disk rotating device. That is, to double the difference of radius δ 2 becomes a value corresponding to this range W4 (φA(2)−Dmin). The lowering distance h of the hub 12 corresponding to the difference of radius δ 2 in this case becomes small, and the disk rotating device Ta can be made still thinner.

(iii) The case in which the maximum outer diameter φA of the hub 12 is set within a range between the minimum value Dmin on the specification of the inside diameter of the disk and the measured minimum value Da that is still smaller than this minimum value Dmin (Da<φA<Dmin).

Particularly in the DVD, the lamination of two discs raises the probability that the inside diameter of a disk is off smaller than the minimum value Dmin on the specification, compared with the case that the inside diameter is off larger than the maximum value Dmax on the specification. Therefore, if the maximum outer diameter φA of the hub 12 is set to, for example, a slightly smaller value φA(3) than the minimum value Dmin on the specification of the inside diameter of the disk, it is possible to render the disk rotating device Ta to function as the fixed type disk rotating device for all the disks having an inside diameter within the specification. and to function as the movable type disk rotating device only for a poor quality disk having an inside diameter smaller than the maximum outer diameter φA(3). Therefore, since the disk rotating device Ta functions as the movable type disk rotating device only for an exceptional disk that is extremely rare as mentioned above, the lowering distance h that the hub 12 moves can be made still smaller.

Further, the elastic compressible member 13 that elastically supports the foregoing hub 12 is not confined to an annular shape, and it may be formed of, for example, a plurality of elastic compressible materials that are placed on the second recess 11β and separated from one another by a specific angular gap.

Further, the maximum outer diameter φA of the hub 12 specifies the size of the portion that is positioned on the side near the disk (upper side in the drawings) relative to the virtual plane including the support plane 11b of the rotating plate 11, and the portion on the side far off the disk (lower side in the drawings) from the support plane 11b may take any shape or dimension.

As described above in detail, the disk rotating device of the invention is able to function as the fixed type disk rotating device when the diameter of the center hole of an inserted disk is larger than the maximum outer diameter of the centering member (hub), and to function as the movable type disk rotating device only when the diameter of the center hole of an inserted disk is smaller than the maximum outer diameter of the centering member. Accordingly, the frequency at which the device functions as the movable type disk rotating device and the stroke (lowering) of the centering member can be reduced. Therefore, the disk rotating device and the disk drive using this disk rotating device can be made thinner.

Further, when functioning as the fixed type disk rotating device, the disk rotating device of the invention is able to reduce the difference between the inside diameter of the disk and the outer diameter of the centering member, and to reduce the eccentricity of a disk during rotation.

What is claimed is:

1. A disk rotating device for rotating disks, each having a center hole, where the diameter of the disk center hole on specification is between a minimum value of Dmin and a maximum value of Dmax, comprising:

a rotating plate having a support part on which a disk is mounted, which a motor drives to rotate about a center axis of rotation;

a centering member that is moveable in the direction of the rotational center axis of the rotating plate on the center of the rotating plate, which centering member has a tapered peripheral guide plane with a maximum outer diameter φA and is inserted through the center hole of the disk to thereby center the disk; and an enabling member provided in a space between the rotating plate and the centering member, which enabling member projects the centering member above the support part, wherein the maximum outer diameter φA of the centering member is within a range of Dmin<φA<Dmax, so that disks with a center hole diameter greater than Dmin and less than or equal to φA will depress the centering member, and disks with a center hole diameter greater than φA and less than Dmax will not depress the centering member.

2. A disk rotating device as claimed in claim 1, wherein the maximum outer diameter φA is within a range of Dmin<φA≦(Dmax+Dmin)/2.

3. A disk rotating device for rotating disks, each having a center hole, where the diameter of the disk center hole on specification is a minimum value of $D_{min}$ and a still smaller center hole diameter of an exceptional disk is given by $D_a$, comprising:

a rotating plate having a support part on which a disk is mounted, which a motor drives to rotate about a center axis of rotation;

a centering member that is moveable in the direction of the rotational center axis of the rotating plate on the center of the rotating plate, which centering member has a tapered peripheral guide plane with a maximum outer diameter φA and is inserted through the center hole of the disk to thereby center the disk; and an enabling member provided in a space between the rotating plate and the centering member, which enabling member projects the centering member above the support part, wherein the maximum outer diameter φA of the centering member is within a range of $D_a < \phi A < D_{min}$, so that disks with a center hole diameter greater than $D_a$ and less than or equal to φA will depress the centering members, causing the device to act as a movable type disk rotating device, and disks with a center hole diameter greater than φA and less than $D_{min}$ will not depress the centering member, causing the device to act as a fixed typed disk rotating device.

4. A disk rotating device for rotating disks, each having a center hole, where the diameter of the disk center hole on specification is between a minimum value of $D_{min}$ and a maximum value of $D_{max}$, comprising:

a rotating plate having a support part on which a disk is mounted, which a motor drives to rotate about a center axis of rotation;

a centering member that is moveable in the direction of the rotational center axis of the rotating plate on the center of the rotating plate, which centering member has a tapered peripheral guide plane with a maximum outer diameter φA and is inserted through the center hole of the disk to thereby center the disk; and an elastic compressible member having two faces of which one face is fastened to the centering member and the other face is fastened to the rotating plate, which elastic member projects the centering member above the support part;

wherein the elastic compressible member comprises an elastic material that produces an elastic deformation by contraction of its volume, and the maximum outer diameter φA of the centering member is within a range of $D_{min} < \phi A < D_{max}$, so that disks with a center hole diameter greater than $D_{min}$ and less than or equal to φA will depress the centering member, and disks with a center hole diameter greater that φA and less than $D_{max}$ will not depress the centering member.

5. A disk rotating device as claimed in claim 4, wherein the elastic compressible member is made of a foaming material or a rubber.

6. A disk rotating device as claimed in claim 4, wherein one face of the elastic compressible member is adhered to the centering member and the other face thereof is adhered to the rotating plate.

7. A disk rotating device as claimed in claim 4, wherein at least one of the centering member and the rotating plate has a recess formed thereon and the elastic compressible member is engaged in the recess.

8. A disk rotating device for rotating disks, each having a center hole, where the diameter of the disk center hole on specification is between a minimum value of Dmin and a maximum value of Dmax, comprising:

a rotating plate having a support part on which a disk is mounted, which a motor drives to rotate about a center axis of rotation;

a centering member that is moveable in the direction of the rotational center axis of the rotating plate on the center of the rotating plate, which centering member has a tapered peripheral guide plane with a maximum outer diameter φA and is inserted through the center hole of the disk to thereby center the disk;

and an elastic compressible member having two faces of which one face is fastened to the centering member and the other face is fastened to the rotating plate, which elastic member projects the centering member above the support part, wherein the maximum outer diameter φA of the centering member is within a range of Dmin<φA<Dmax, so that disks with a center hole diameter greater than Dmin and less than or equal to φA will depress the centering member, and disks with a center hole diameter greater than φA and less than Dmax will not depress the centering member.

9. A disk rotating device as claimed in claim 8, wherein the maximum outer diameter φA is within a range of Dmin<φA≦(Dmax+Dmin)/2.

10. A disk rotating device as claimed in claim 8, wherein the elastic compressible member is made of a foaming material or a rubber.

11. A disk rotating device as claimed in claim 8, wherein one face of the elastic compressible member is adhered to the centering member and the other face thereof is adhered to the rotating plate.

12. A disk rotating device as claimed in claim 8, wherein at least one of the centering member and the rotating plate has a recess formed thereon and the elastic compressible member is engaged in the recess.

13. A disk rotating device for rotating disks, each having a center hole, where the diameter of the disk center hole on specification is a minimum value of $D_{min}$ and a still smaller center hole diameter of an exceptional disk is given by $D_a$, comprising:

a rotating plate having a support part on which a disk is mounted, which a motor drives to rotate about a center axis of rotation;

a centering member that is moveable in the direction of the rotational center axis of the rotating plate on the center of the rotating plate, which centering member has a tapered peripheral guide plane with a maximum outer diameter φA and is inserted through the center hole of the disk to thereby center the disk; and an elastic compressible my having two faces of which one face is fastened to the centering member and the other face is fastened to the rotating plate, which elastic member projects the centering member above the support part, wherein the maximum outer diameter φA of the centering member is within a range of $D_a < \phi A < D_{min}$, so that disks with a center hole diameter greater than $D_a$ and less than or equal to φA will depress the centering member, causing the device to act as a movable type disk rotating device, and disks with a center hole diameter greater than φA and less than $D_{min}$ will not depress the centering member, causing the device to act as a fixed typed disk rotating device.

14. A disk rotating device as claimed in claim 13, wherein the elastic compressible member is made of a foaming material or a rubber.

15. A disk rotating device as claimed in claim 13, wherein one face of the elastic compressible member is adhered to the centering member and the other face thereof is adhered to the rotating plate.

16. A disk rotating device as claimed in claim 13, wherein at least one of the centering member and the rotating plate has a recess formed thereon and the elastic compressible member is engaged in the recess.

* * * * *